(12) United States Patent  (10) Patent No.: US 8,199,998 B2
Okajima et al.  (45) Date of Patent: Jun. 12, 2012

(54) MODULE FOR DETECTING POORLY DIFFERENTIATED CANCERS AND PATHOLOGICAL IMAGE DIAGNOSIS SUPPORT APPARATUS, PROGRAM AND RECORDING MEDIUM INCLUDING THE SAME

(75) Inventors: Kenji Okajima, Minato-ku (JP); Yoshiko Yamashita, Minato-ku (JP); Akira Saito, Minato-ku (JP)

(73) Assignee: NEC Corporation, Tokyo (JP)

( * ) Notice: Subject to any disclaimer, the term of this patent is extended or adjusted under 35 U.S.C. 154(b) by 858 days.

(21) Appl. No.: 12/265,292

(22) Filed: Nov. 5, 2008

(65) Prior Publication Data

US 2009/0116723 A1 May 7, 2009

(30) Foreign Application Priority Data

Nov. 6, 2007 (JP) ................. 2007-288563

(51) Int. Cl.
*G06K 9/00* (2006.01)

(52) U.S. Cl. ..................... 382/133

(58) Field of Classification Search ........... None
See application file for complete search history.

(56) References Cited

U.S. PATENT DOCUMENTS

| | | | | |
|---|---|---|---|---|
| 7,693,334 B2 * | 4/2010 | Ogura et al. | ................. | 382/128 |
| 7,761,240 B2 * | 7/2010 | Saidi et al. | ................. | 382/128 |
| 2006/0115146 A1 * | 6/2006 | Ogura et al. | ................. | 382/128 |
| 2009/0190812 A1 * | 7/2009 | Sano et al. | ................. | 382/128 |
| 2009/0190821 A1 * | 7/2009 | Marugame | ................. | 382/133 |
| 2010/0054560 A1 * | 3/2010 | Yamashita et al. | ............. | 382/128 |
| 2011/0170754 A1 * | 7/2011 | Yoshihara et al. | ............. | 382/128 |

FOREIGN PATENT DOCUMENTS

| | | | |
|---|---|---|---|
| JP | 57-153367 A | | 9/1982 |
| JP | 58-223868 A | | 12/1983 |
| JP | 62-135767 A | | 6/1987 |
| JP | 02-035358 A | | 2/1990 |
| JP | 10-197522 A | | 7/1998 |
| JP | 2001-059842 A | | 3/2001 |
| JP | 2004-286666 A | | 10/2004 |
| JP | 2006-153742 A | | 6/2006 |
| JP | 2010281637 A | * | 12/2010 |

* cited by examiner

*Primary Examiner* — Jermele M Hollington
(74) *Attorney, Agent, or Firm* — Sughrue Mion, PLLC

(57) ABSTRACT

The detection accuracy of poorly differentiated cancers in adenocarcinoma is improved by restricting false detection. Cell nucleus detection means 1 receives a digitized pathological image as an input and extracts the region of a cell nucleus therefrom. Gland duct detection means 2 detects a gland duct structure in the image. Poorly differentiated cancer detection means 4 detects poorly differentiated cancers only in the region other than the gland duct region. False detection rejection means 7 compares the detection density of poorly differentiated cancer in the vicinity of a detection point with a threshold that is predetermined depending on gland duct density in the vicinity of the detection point, at each detection point detected by poorly differentiated cancer detection means 4 and rejects the detection point as a false detection if the detection density of a poorly differentiated cancer is smaller than the threshold.

18 Claims, 4 Drawing Sheets

MODULE FOR DETECTING POORLY DIFFERENTIATED CANCERS AND PATHOLOGICAL IMAGE DIAGNOSIS SUPPORT APPARATUS, PROGRAM AND RECORDING MEDIUM INCLUDING THE SAME

This application is based upon and claims the benefit of priority from Japanese patent application No. 2007-288563, filed on Nov. 6, 2007, the disclosure of which is incorporated herein in its entirety by reference.

BACKGROUND OF THE INVENTION

1. Field of the Invention

The present invention relates to a pathological image diagnosis support system for supporting clinical diagnosis by computer that processes an image converted into digitized data.

2. Description of the Related Art

In the pathological diagnosis of cancer, a "tissue examination" or histopathology in which a pathologist observes a specimen of a focal tissue, which has been collected by a needle biopsy or a surgical operation, with a microscope to perform the diagnosis of its benignancy and malignancy, and a "cytological examination" or cytopathology in which a pathologist also observes a cell specimen in secreta such as sputum with a microscope to determine its benignancy or malignancy, are widely practiced.

A pathological image diagnosis support system is an apparatus for supporting such diagnosis by computer processing of digitized images. Patent Document 1 (Japanese Patent Laid-Open No. S57-153367) discloses a method in which the size of the nucleus of an individual cell, the staining intensity within the nucleus, and the like in an image are measured and the degree of the malignancy of the cell is determined based on the measured values.

Further, Patent Document 2 (Japanese Patent Laid-Open No. S62-135767) discloses a method in which feature parameters of a cell image are extracted, and normal and abnormal cells are distinguished in two steps. Further, Patent Document 3 (Japanese Patent Laid-Open No. S58-223868) discloses a method in which the cytoplasm and nucleus of a cell are detected concurrently using an isolated cell processing part and a clustered cell processing part to diagnose the benignancy and malignancy of the cell.

These inventions are based on a methodology to examine individual cells to determine the benignancy or malignancy thereof, and therefore it may be considered that they are primarily intended for cytological examination. This is because, a cytological examination by definition does not allow observing the macroscopic structure of tissue and therefore a cytological examination is an examination to investigate individual cells to determine their benignancy or malignancy.

On the other hand, in the tissue examination, the pathologist observes macroscopic structural features of tissue besides the information concerning individual cells and combines those to determine benignancy or malignancy. Because of this, it is said that the tissue examination enables more accurate determination.

Accordingly, Patent Document 4 (Japanese Patent Laid-Open No. H10-197522) discloses a method in which macroscopic information, such as the number of cell nuclei, is extracted to determine the conformity of a tissue image to a predetermined plurality of diagnostic categories which represent pathohistological features.

Further, Patent Document 5 (Japanese Patent Laid-Open No. 2001-59842) discloses a method in which the features based on the positional relationship or distribution pattern of cavities and cell nuclei are converted into numerical forms, and this information is used to determine of benignancy or malignancy.

Further, Patent Document 6 (Japanese Patent Laid-Open No. 2006-153742) discloses a pathological diagnosis support system and method in which a sub-image centered around the cell nucleus, hole, cytoplasm, stroma, or the like is extracted including periphery to determine the presence or absence of a tumor and the benignancy and malignancy of the tumor based on the sub-image.

FIG. 1 is a block diagram to show the configuration of the pathological diagnosis support system disclosed by Patent Document 6. As shown in FIG. 1, the support system includes learning pattern input means 100, learning pattern storage means 101, feature candidate generation means 102, feature determination means 103, feature storage means 104, classifying table generation means 105, and classifying table 106.

Learning pattern input means 100 extracts a sub-image centered around a cell nucleus, hole, cytoplasm, stroma, or the like from a pathological image to be diagnosed, and stores the sub-image in learning pattern storage means 101.

Learning pattern storage means 101 is means for storing and retaining a desired number of sub-images to be used for learning.

Feature candidate generation means 102 is means for successively generating feature candidates from a predetermined number of feature parameter sets.

Feature determination means 103 is means for determining a set of features most suitable for pattern recognition among the feature candidates generated by feature candidate generation means 102.

Feature storage means 104 is means for storing and retaining the set of features determined by feature determination means 103.

Classifying table generation means 105 is means for generating classifying table 106 for performing diagnosis using the set of features determined by feature determination means 103.

The invention according to Patent Document 6 takes into consideration that a cell nucleus and peripheral tissue thereof are stained to a respective inherent color since the tissue collected in a pathological examination is subject to staining (staining by hematoxylene or eosin etc.), and color information of the cell nucleus is extracted at the same time as extracting a sub-image centered around a cell nucleus, hole, cytoplasm, stroma, or the like from a pathological image to store both as feature candidates so that the presence or absence of a tumor, and the benignancy and malignancy of the tumor can be determined with a higher accuracy.

When intended for tissue examination, the above described invention does not offer high detection accuracy especially for poorly differentiated cancers in the adenocarcinoma. This is because that the analysis of the structure of a gland duct in a tissue image has not been conducted in the related art.

In the determination of an "adenocarcinoma" which is a cancer of a gland duct cell, a pathologist observes the gland duct structure as well, and this information is of great utility for determining benignancy and malignancy. Especially, in an adenocarcinoma which is called a "poorly differentiated cancer", since cancer cells do not form a gland duct structure, the presence and absence of a normal gland duct structure provide an important measure for making the determination.

Thus, since there has not been any method of analyzing the gland duct structure and using that information for making a determination even though the information about the gland duct structure is an important measure for determining benignancy and malignancy, a problem has existed in that the determination accuracy has not reached a sufficient level. Adenocarcinomas are a critical cancer which widely takes place in digestive organs such as the stomach and large intestine etc. and genital organs such as the mammary gland etc.

Although Patent Document 4 or 5 describes that a cavity in a tissue image is analyzed and that information is used for the determination, the cavity analyzed in those inventions refers to a spacial gap peculiar to a cancer type called "cribriform cancer", and is totally different from the cavity seen in a normal gland duct.

According to the invention described in Patent Document 6, although it is possible to determine the presence or absence of a tumor and the benignancy or malignancy of the tumor with high accuracy and in a short time based on a sub-image by extracting a sub-image centered around a cell nucleus, hole, cytoplasm, stroma, or the like from a pathological image and storing the sub-image as a learning pattern and input pattern, taking into consideration that changes in the cell nuclei and peripheral tissues thereof etc. are important factors to discriminate whether a tumor is benignant or malignant, there has always been a demand to improve the determination accuracy thereof.

3. Summary of the Invention

It is an objective of the present invention to provide a pathological image diagnosis support apparatus and a poorly differentiated cancer detection module for implementing the same, which is targeted for tissue examination and which has a high determination accuracy for poorly differentiated cancers in the adenocarcinoma.

The poorly differentiated cancer detection module of the present invention is a poorly differentiated cancer detection module for detecting a cancer cell from an inputted pathological tissue image, comprising:

cancer cell detection means for detecting a cancer cell from the pathological tissue image, gland duct detection means for detecting a gland duct region from the pathological tissue image, and search region limiting means for excluding the gland duct region detected by the gland duct detection means from a cancer cell search region in which the cancer cell detection means detects a cancer.

The poorly differentiated cancer detection module according to another embodiment of the present invention is a poorly differentiated cancer detection module for detecting a cancer cell from an inputted pathological tissue image, comprising:

cancer cell detection means for detecting a cancer cell from the pathological tissue image, gland duct detection means for detecting a gland duct region from the pathological tissue image, search region limiting means for excluding the gland duct region detected by the gland duct detection means from a cancer cell search region in which the cancer cell detection means detects a cancer, gland duct density calculation means for calculating a gland duct density which is a density of the gland duct detected by the gland duct detection means in the vicinity of a plurality of detection points detected as a cancer cell by the cancer cell detection means in the pathological tissue image, cancer cell density calculation means for calculating a cancer cell density which is the density of the cancer cell detected by the cancer cell detection means in the vicinity of the plurality of detection points, and false detection rejection means for determining whether or not each detection point detected by the cancer cell detection means is a false detection based on the gland duct density and the cancer cell density calculated in the vicinity of the plurality of detection points, and rejecting the false detection.

The pathological image diagnosis support apparatus of the present invention comprises the above described poorly differentiated detection module.

The method of detecting a poorly differentiated cancer of the present invention is a method of detecting a poorly differentiated cancer for a cancer cell from an inputted pathological tissue image, wherein cancer cell detection means detects a cancer cell from the pathological tissue image, gland duct detection means detects a gland duct region from the pathological tissue image, and search region limiting means excludes the gland duct region from a cancer cell search region in which the cancer cell detection means detects a cancer.

The method of detecting a poorly differentiated cancer according to another embodiment of the present invention is a method of detecting a poorly differentiated cancer for a cancer cell from an inputted pathological tissue image, wherein cancer cell detection means detects a cancer cell from the pathological tissue image, gland duct detection means detects a gland duct region from the pathological tissue image, search region limiting means excludes the gland duct region from a cancer cell search region in which the cancer cell detection means detects a cancer, gland duct density calculation means calculates gland duct density which is a density of the gland duct detected by the gland duct detection means in the vicinity of a plurality of detection points in the pathological tissue image, the detected points being detected as a cancer cell by the cancer cell detection means, cancer cell density calculation means calculates a cancer cell density which is the density of the cancer cell detected by the cancer cell detection means in the vicinity of the plurality of detection points, and false detection rejection means determines whether or not each detection point detected by the cancer cell detection means is a false detection based on the gland duct density and the cancer cell density calculated in the vicinity of the plurality of detection points to reject the false detection.

The program of the present invention causes a computer system to execute the above described method.

The recording medium of the present invention stores the above described program.

EXEMPLARY EMBODIMENT

Next, exemplary embodiments will be described in detail with reference to the drawings.

Figure 1:
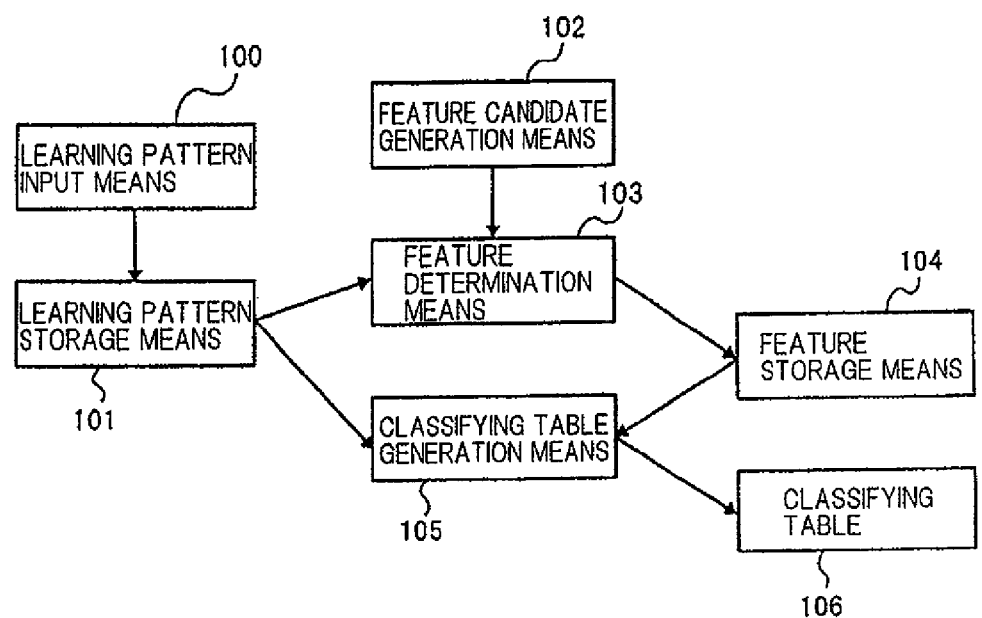
FIG. 1 is a block diagram to show the configuration of a pathological diagnosis support system relating to the present invention.
Figure 2:
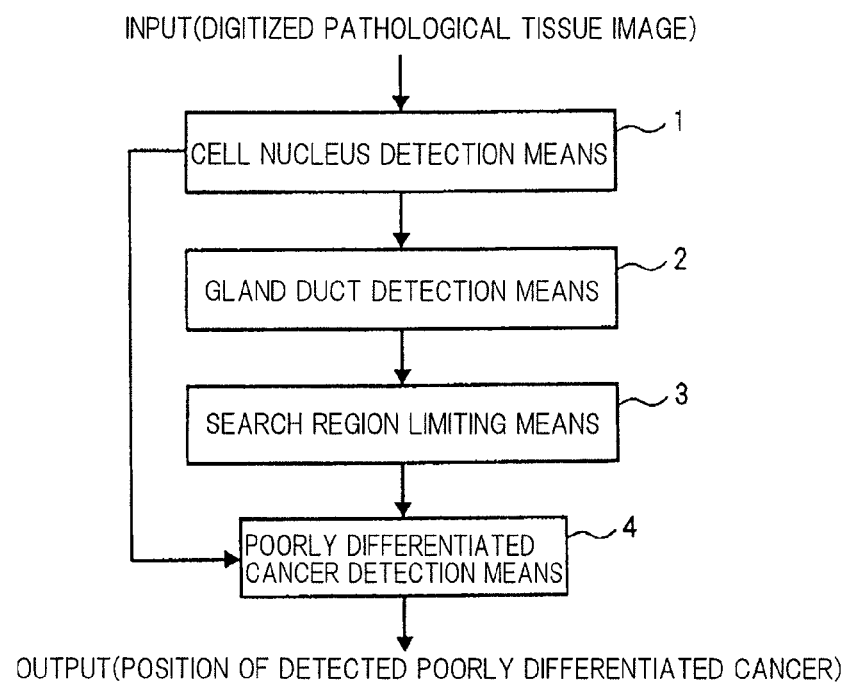
FIG. 2 is a block diagram to show the configuration of a first exemplary embodiment.

FIG. 2 is a block diagram to show the configuration of a first exemplary embodiment of the poorly differentiated cancer detection module according to the present invention.

The present exemplary embodiment is used in combination with the pathological diagnosis support system according to Patent Document 6, and is configured to be inputted with a digitized pathological tissue image and to detect the position of a poorly differentiated cancer to output the image of the aforementioned position.

The present exemplary embodiment includes cell nucleus detection means 1, gland duct detection means 2, search region limiting means 3, and poorly differentiated cancer detection means 4. Cell nucleus detection means 1 receives a digitized pathological tissue image as an input and detects a cell nucleus from the image. Gland duct detection means 2 detects a gland duct from an image using the information of detected cell nuclei. Search region limiting means 3 excludes the detected gland duct region from the poorly differentiated cancer search region. Poorly differentiated cancer detection means 4 searches poorly differentiated cancers in the limited search region.

Figure 3:
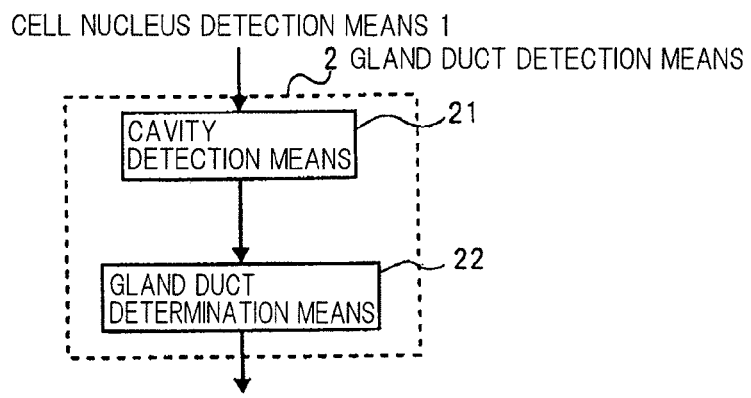
FIG. 3 is a block diagram to show the operation of the first exemplary embodiment.

FIG. 3 is a block diagram to specifically show the configuration of gland duct detection means 2 in FIG. 2, and gland duct detection means 2 comprises cavity detection means 21 and gland duct determination means 22 as illustrated.

Next, the operation of the present exemplary embodiment will be described in detail with reference to FIGS. 2 and 3.

First, cell nucleus detection means 1 receives a pathological tissue image, which is obtained by photographing a pathological slide using a microscope etc. and converting it into digitized data, as an input where the pathological slide is assumed to be stained with hematoxylene-eosin as is performed in a usual pathological examination.

Cell nucleus detection means 1 performs color processing for each pixel of the input image and detects pixels that are stained in blue by hematoxylene, thereby extracting the detected pixels as a cell nucleus region.

That is, by referring to a predetermined color region of cell nucleus, only pixels whose RGB values belong to the color region of cell nucleus are selected and extracted from an image where the color region of cell nucleus is predetermined by the following method.

First, images of cell nuclei which are differently stained due to the difference in staining process are collected. Next, RGB values of each pixel in a cell nucleus region are examined in each of the images. At the same time, the RGB values of pixels in a region stained in eosin and pixels in a white region in each image are investigated. Then, a color region which includes no or almost no pixels of the eosin-stained region or of the white region and which includes pixels of the cell nucleus region are determined to be the color region of the cell nucleus. Of course, the method for detecting the cell nucleus region stained in blue is not limited to the above described method. For example, detection may be performed according to the method disclosed in, for example, Patent Document 6.

Next, gland duct detection means 2 detects a gland duct from an image using the information on cell nucleus.

Referring to FIG. 3, gland duct detection means 2 comprises cavity detection means 21 and gland duct determination means 22. Here, processing by gland duct detection means 2 will be described in detail by referring to the drawings where description will be made on a pathological image of a stomach.

Figure 4:
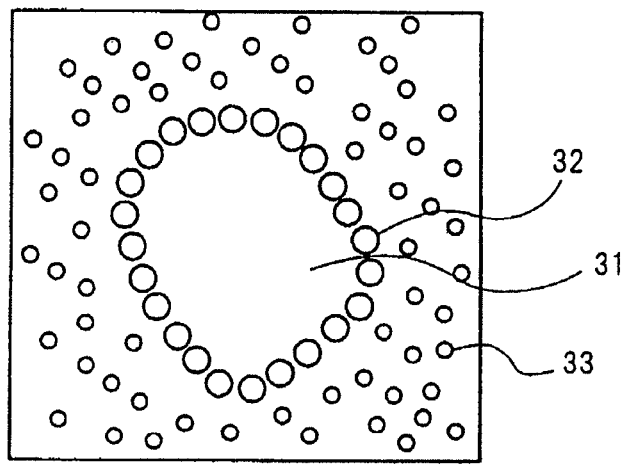
FIG. 4 shows a specific operation of the first exemplary embodiment.

A gland duct is a duct which secretes a body fluid such as gastric juice and has a structure in which gland duct cells are aligned around the duct. Since the tissue is sliced to be observed in a pathological image, a duct appears to be a cavity. FIG. 4 schematically shows the appearance of a typical gland duct.

In FIG. 4, the region of cell nucleus 32 is shown by a hollow circle, and a state in which cell nuclei 32 of a gland duct cell is aligned around cavity 31 is shown.

Further, there are scattered nuclei 33 of cells other than the gland duct cells outside the gland duct. First, gland duct detection means 2 detects the region of cavity 31 in which no cell nucleus 32 exists from an image using cavity detection means 31. Specifically, using a circular mask pattern of a predetermined size, an area in which the mask pattern can be placed without overlapping cell nucleus 32 is detected in an image.

Figure 5:
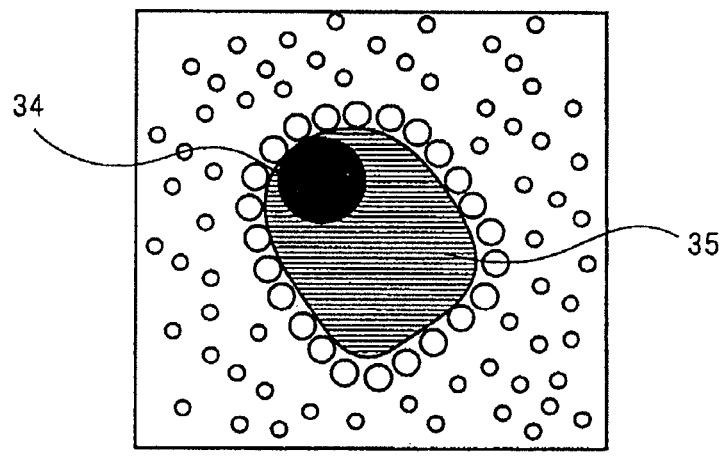
FIG. 5 shows a specific operation of the first exemplary embodiment.

FIG. 5 shows an example in which black disc 34 shows the above described mask pattern placed without overlapping a cell nucleus. Further, the striped region in FIG. 5 represents cavity region 35 which has thus been detected (a part of which is hidden by black disc 34).

Figure 6:
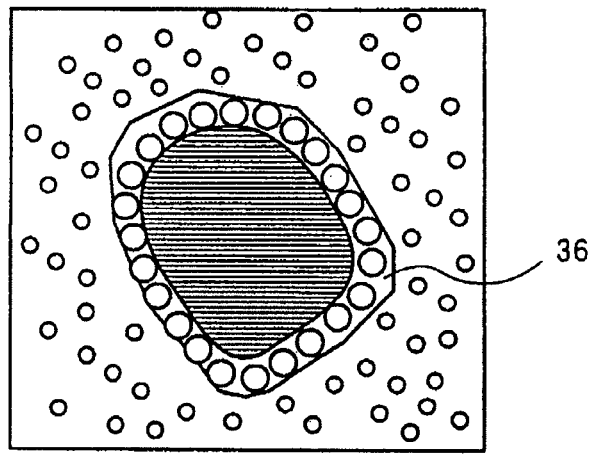
FIG. 6 shows a specific operation of the first exemplary embodiment.

Next, gland duct detection means 2 uses gland duct determination means 22 to confirm whether there are gland duct cells aligned around detected cavity region 35, and determines the gland duct region. Specifically, gland duct determination means 22 sets band 36 having a predetermined width outside detected cavity 31 as shown in FIG. 6, and counts the pixels of cell nuclei 32 present in band 36 which is then, divided by the area of band 36 to calculate the density of cell nuclei 32 in band 36. FIG. 6 schematically shows the region of the above described band 36 for calculating the density of cell nuclei 32, outside detected cavity 31 as being.

Gland duct determination means 22 regards cavity 31 is surrounded by gland duct cells when the thus calculated density is greater than a predetermined threshold, and determines that cavity 31 and cell nuclei 32 that are present in band 36 around cavity 31 to be a gland duct region. It is noted that the method of detecting a gland duct is not limited to the one described herein. For example, a method of examining aligned gland duct cells by use of a direction filter etc. thereby determining the gland duct more accurately may be used.

Next, search region limiting means 3 shown in FIG. 2 masks the gland duct region detected by gland duct detection means 2 from an input image and forwards it to poorly differentiated cancer detection means 4.

Poorly differentiated cancer detection means 4 successively performs determination processing for nuclei 31 present in the region other than the gland duct region by referring to the mask received from search region limiting means 3, thus performing detection processing of poorly differentiated cancers.

This poorly differentiated cancer detection means is subject to a learning process in advance according to the method disclosed by Patent Document 6. That is, first, a learning set is prepared. The learning set is made up of sub-images of the peripheries centered around the nuclei of a poorly differentiated cancer, and sub-images of the peripheries centered around the nuclei of a normal cell.

According to the method disclosed by Patent Document 6, learning is performed in advance so that the sub-images of these two kinds in the learning set can be correctly classified. As a result of such learning, poorly differentiated cancer detection means is enabled to output the determination of whether each of the nuclei in the image is a nucleus of poorly differentiated cancer or a normal nucleus. Processing to detect poorly differentiated cancer is not limited to this method, and other methods may be used.

By the way, while the nucleus of a cancer cell has generally been enlarged in size, the nucleus of a normal gland duct cell may also has been enlarged when it has an inflammation. Therefore, if determination is made by focusing only on individual nucleus, it may happen that an enlarged normal gland duct cell is falsely determined to be a cancer cell. However, in the present exemplary embodiment, since the region of normal gland duct is excluded from the search region of poorly differentiated cancer, it is possible to reduce such false determination thereby improving the detection accuracy of a poorly differentiated cancer.

Figure 7:
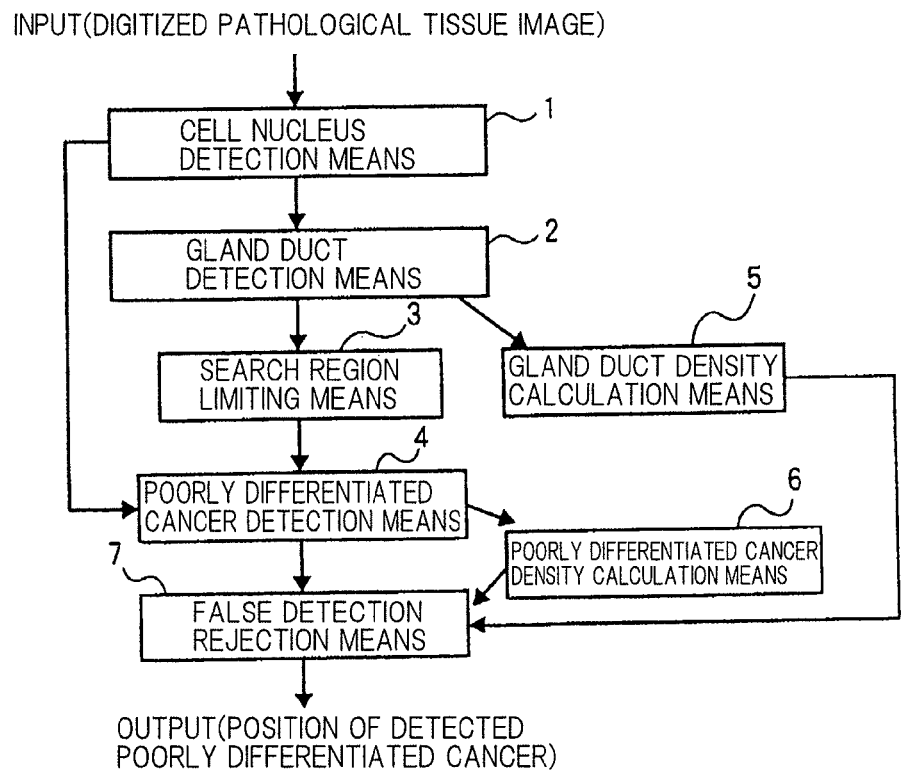
FIG. 7 shows the configuration of a second exemplary embodiment.
Figure 8:
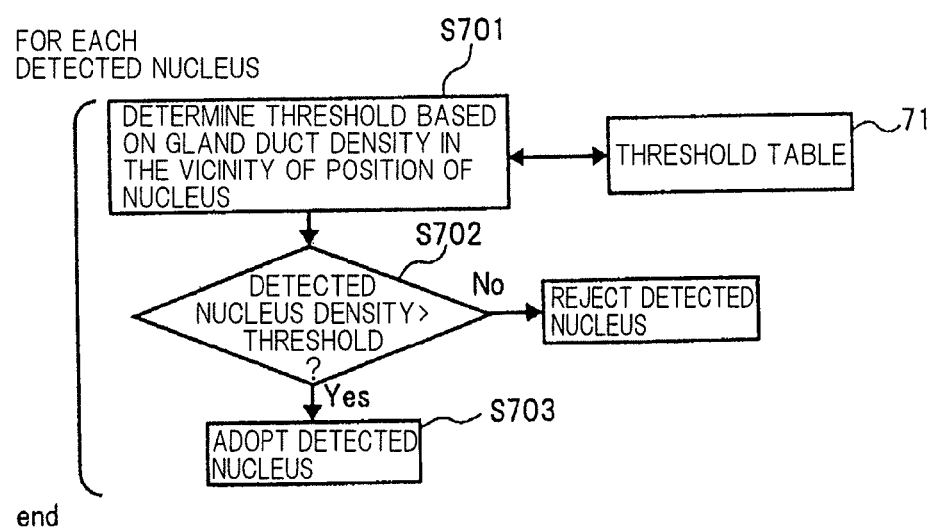
FIG. 8 shows the operation of the second exemplary embodiment.

FIG. 7 is a block diagram to show the configuration of a second exemplary embodiment, and FIG. 8 shows the characteristic operation thereof. The second exemplary embodiment will be described with reference to FIGS. 7 and 8.

The present exemplary embodiment includes cell nucleus detection means 1, gland duct detection means 2, search region limiting means 3, poorly differentiated cancer detection means 4, and in addition to those, gland duct density calculation means 5, poorly differentiated cancer density calculation means 6, and false detection rejection means 7.

In the present exemplary embodiment, poorly differentiated cancer density calculation means 5 and false detection rejection means 6 perform the following processing in order to further reduce false detection.

Gland duct density calculation means 5 calculates the density of the gland duct detected by gland duct detection means 2. Poorly differentiated cancer density calculation means 6 calculates the density of the poorly differentiated cancer detected by poorly differentiated cancer detection means 4, at each detection point. False detection rejection means 6 rejects the detection points, at which there is a high possibility of false detection, from the detection points by poorly differentiated cancer detection means 4.

The operation of the present exemplary embodiment will be described with reference to the drawings. Since the operations of cell nucleus detection means 1, gland duct detection means 2, search region limiting means 3, and poorly differentiated cancer detection means 4 are the same as those in the first exemplary embodiment, the description thereof will be omitted.

Gland duct density calculation means 5 calculates the density of the gland duct detected by gland duct detection means 2 at each point in an image. That is, at each point in an image, pixels of a nucleus in the gland duct region present in a predetermined spread centered around the point are counted and divided by the area of the spread to calculate a gland duct density. Then, the result is forwarded to false detection rejection means 7.

Poorly differentiated cancer density calculation means 6 calculates the density of the poorly differentiated cancer detected by poorly differentiated cancer detection means 4 in the vicinity of each detection point. That is, the number of detection points present in a predetermined spread centered around each of the detection points detected by poorly differentiated cancer detection means 4 are counted and divided by the area of the spread to calculate a poorly differentiated cancer density. Then, the result is forwarded to false detection rejection means 7.

The operation of false detection rejection means 7 will be described with reference to FIG. 8. False detection rejection means 7, at each detection point detected by poorly differentiated cancer detection means 4, determines a threshold which is predetermined depending on the gland duct density calculated at the same point (step S701). The threshold is experimentally predetermined and recorded in threshold table 71.

Next, the density of a poorly differentiated cancer (detected nucleus density) calculated by poorly differentiated cancer density calculation means 6 is compared with the threshold determined at step S701 (step S702). Then, if the density of a poorly differentiated cancer is smaller than the threshold that is determined depending on the gland duct density, this detection point (detected nucleus) is regarded as a false detection and rejected. Then the detection points (detected nuclei) which remain without being rejected are adopted and marked in the input image to be outputted (step S703).

So far description has focused on the detection processing of a poorly differentiated cancer. In an application for which other cancers such as highly differentiated cancers need to be detected as well, such a function needs to be configured as a separate module; however, this is out of the scope of the present invention and therefore is omitted.

It is noted that, as described so far, the present exemplary embodiment is configured to be used in combination with a pathological diagnosis support system, and a pathological diagnosis support apparatus equipped with a poorly differentiated cancer detection module of the present invention is to be included in the present invention.

Each means shown in each exemplary embodiment is supposed to be constructed on a general computer system, and a program for implementing each means on a computer system, and a recording medium for storing the program are also included in the present invention.

The present invention offers the advantage of improving the determination accuracy for poorly differentiated cancers in an adenocarcinoma. The reason for this is that false detection of a poorly differentiated cancer which cannot exist in a gland duct can be avoided by only searching for the poorly differentiated cancer in regions other than the gland duct region. Further, another reason is that false detection can be restricted by increasing the detection threshold of a poorly differentiated cancer in a region having a high gland duct density because of the fact that there is a low possibility of the presence of a poorly differentiated cancer in the region where a normal gland duct structure is preserved.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A poorly differentiated cancer detection module for detecting a cancer
   cell from an inputted pathological tissue image, comprising:
   cancer cell detection means for detecting a cancer cell from said 5 pathological tissue image,
   gland duct detection means for detecting a gland duct region from said pathological tissue image, and
   search region limiting means for excluding the gland duct region detected by said gland duct detection means from a cancer cell search 10 region in which said cancer cell detection means detects a cancer.

2. A poorly differentiated cancer detection module for detecting a cancer cell from an inputted pathological tissue image, comprising:

cancer cell detection means for detecting a cancer cell from said 1 pathological tissue image, gland duct detection means for detecting a gland duct region from said pathological tissue image, search region limiting means for excluding the gland duct region detected by said gland duct detection means from a cancer cell search region in which said cancer cell detection means detects a cancer, gland duct density calculation means for calculating a gland duct density which is a density of the gland duct detected by the gland duct detection means in the vicinity of a plurality of detection points detected as a cancer cell by said cancer cell detection means in said pathological tissue image, cancer cell density calculation means for calculating a cancer cell density which is the density of the cancer cell detected by said cancer cell detection means in the vicinity of said plurality of detection points, and false detection rejection means for determining whether or not each detection point detected by the cancer cell detection means is a false detection based on said gland duct density and said cancer cell density calculated in the vicinity of said plurality of detection points, and rejecting the false detection.

3. The poorly differentiated cancer detection module according to claim 2, wherein
said false detection rejection means compares a threshold that is predetermined, depending on the values of gland duct density, with a cancer cell density, and if the cancer cell density is smaller than the threshold, the detection point is regarded as a false detection and thereby rejected.

4. The poorly differentiated cancer detection module according to claim 1, wherein
said gland duct detection means detects a cavity in which no cell nucleus exists from an image, and further detects a gland duct by detecting that the nuclei of gland duct cell surround the periphery of the cavity.

5. The poorly differentiated cancer detection module according to claim 2, wherein
said gland duct detection means detects a cavity in which no cell nucleus exists from an image, and further detects a gland duct by detecting that the nuclei of gland duct cell surround the periphery of the cavity.

6. The poorly differentiated cancer detection module according to claim 3, wherein
said gland duct detection means detects a cavity in which no cell nucleus exists from an image, and further detects a gland duct by detecting that the nuclei of gland duct cell surround the periphery of the cavity.

7. A pathological image diagnosis support apparatus, comprising the poorly differentiated cancer detection module according to claim 1.

8. A pathological image diagnosis support apparatus, comprising the poorly differentiated cancer detection module according to claim 2.

9. A pathological image diagnosis support apparatus, comprising the poorly differentiated cancer detection module according to claim 3.

10. A method of detecting a poorly differentiated cancer for a cancer cell from an inputted pathological tissue image, wherein
cancer cell detection means detects a cancer cell from said pathological tissue image, gland duct detection means detects a gland duct region from said pathological tissue image, and search region limiting means excludes said gland duct region from a cancer cell search region in which said cancer cell detection means detects a cancer.

11. A method of detecting a poorly differentiated cancer for a cancer cell from an inputted pathological tissue image, wherein
cancer cell detection means detects a cancer cell from the pathological tissue image, gland duct detection means detects a gland duct region from the pathological tissue image, search region limiting means excludes the gland duct region from a cancer cell search region in which the cancer cell detection means detects a cancer, gland duct density calculation means calculates a gland duct density which is a density of the gland duct detected by said gland duct detection means in the vicinity of a plurality of detection points in the pathological tissue image, said detection points being detected as a cancer cell by said cancer cell detection means, cancer cell density calculation means calculates a cancer cell density which is the density of the cancer cell detected by said cancer cell detection means in the vicinity of said plurality of detection points, and false detection rejection means determines whether or not each detection point detected by said cancer cell detection means is a false detection based on said gland duct density and said cancer cell density calculated in the vicinity of said plurality of detection points to reject the false detection.

12. The method of detecting a poorly differentiated cancer according to claim 11, wherein
said false detection rejection means compares a threshold that is
predetermined depending on the values of gland duct density, with a cancer cell density, and if the cancer cell density is smaller than the threshold, the detection point is regarded as a false detection and thereby rejected.

13. The method of detecting a poorly differentiated cancer according to claim 10, wherein
said gland duct detection means detects a cavity in which no cell nucleus exists from an image, and further detects a gland duct by detecting that the nuclei of the gland duct cell surround the periphery of the cavity.

14. The method of detecting a poorly differentiated cancer according to claim 11, wherein
said gland duct detection means detects a cavity in which no cell nucleus exists from an image, and further detects a gland duct by detecting
that the nuclei of the gland duct cell surround the periphery of the cavity.

15. The method of detecting a poorly differentiated cancer according to claim 12, wherein
said gland duct detection means detects a cavity in which no cell nucleus exists from an image, and further detects a gland duct by detecting that the nuclei of the gland duct cell surround the periphery of the cavity.

16. A computer readable recording medium storing a program for performing the method of claim 10.

17. A computer readable recording medium storing a program for performing the method of claim 11.

18. A computer readable recording medium storing a program for performing the method of claim 12.

* * * * *